United States Patent
Boysen et al.

(10) Patent No.: US 10,432,782 B2
(45) Date of Patent: Oct. 1, 2019

(54) COMMUNICATION MODULE (71) Applicant: Phoenix Contact GmbH & Co. KG, Blomberg (DE)

(72) Inventors: Gerrit Boysen, Paderborn (DE); Matthias Klocke, Steinhagen (DE); Ralf Hausmann, Blomberg (DE); Stephan Freischlad, Schieder-Schwalenberg (DE); Sven Grosspietsch, Blomberg-Cappel (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 101 days.

(21) Appl. No.: 15/028,675

(22) PCT Filed: Nov. 12, 2014

(86) PCT No.: PCT/EP2014/074320
§ 371 (c)(1),
(2) Date: Apr. 11, 2016

(87) PCT Pub. No.: WO2015/071283
PCT Pub. Date: May 21, 2015

(65) Prior Publication Data
US 2016/0261736 A1  Sep. 8, 2016

(30) Foreign Application Priority Data
Nov. 14, 2013  (DE) .................... 10 2013 112 511 U (51) Int. Cl.
*H04M 3/18* (2006.01)
*H04M 1/74* (2006.01)
(Continued)

(52) U.S. Cl.
CPC .............. *H04M 3/18* (2013.01); *H02H 9/042* (2013.01); *H04L 43/065* (2013.01); *H04M 1/745* (2013.01); *H04Q 1/146* (2013.01)

(58) Field of Classification Search
CPC .... H04M 3/18; H04M 1/745; H04M 2201/80; H04L 43/065; H02H 9/042
See application file for complete search history.

(56) References Cited

U.S. PATENT DOCUMENTS 5,392,349 A * 2/1995 Elder, Jr. ................ H04M 3/18
361/119
5,805,404 A * 9/1998 Kane ...................... H04Q 1/146
361/111

(Continued)

FOREIGN PATENT DOCUMENTS

| DE | 10000098 A1 | 7/2001 |
| DE | 10 2004 006 987 B3 | 8/2005 |
| DE | 10 2011 110 252 A1 | 12/2012 |

OTHER PUBLICATIONS

ISA/EP, International Search Report, Int'l Application No. PCT/EP2014/074320, Jan. 23, 2015, European Patent Office, Rijswijk, NL, 10 pgs.

*Primary Examiner* — Ronald W Leja
*Assistant Examiner* — Christopher J Clark
(74) *Attorney, Agent, or Firm* — Holland & Hart LLP (57) ABSTRACT The invention relates to a communication module (100) comprising a communication circuit (101), a communication interface for transferring data to an electric data line (103); and to an overvoltage protection module (105) for protecting the communication circuit (101) from an overvoltage on the electric data line (103) which is integrated in an insertable manner into the communication module (100).

12 Claims, 5 Drawing Sheets (51) Int. Cl.
*H02H 9/04* (2006.01)
*H04Q 1/14* (2006.01)
*H04L 12/26* (2006.01)

(56) References Cited

U.S. PATENT DOCUMENTS

| | | |
|---|---|---|
| 7,268,993 B2 | 9/2007 | Dement |
| 2002/0141543 A1* | 10/2002 | Dunlap ................ H04M 3/304 379/27.01 |
| 2004/0196602 A1 | 10/2004 | Sharpe |
| 2007/0003056 A1 | 1/2007 | Otto et al. |
| 2008/0310060 A1 | 12/2008 | Metral et al. |
| 2012/0250831 A1* | 10/2012 | Gorecki, Jr. .......... H04L 12/282 379/37 |
| 2012/0262832 A1 | 10/2012 | Adomaitis et al. |

* cited by examiner

COMMUNICATION MODULE

CROSS REFERENCES

The present application is a 371 national phase of International Application No. PCT/EP2014/074320, entitled "Communication Module", filed Nov. 12, 2014, which claims priority to German Patent Application No. 10 2013 112 511.5, entitled "Kommunikationsmodul", filed Nov. 14, 2013.

FIELD OF THE INVENTION

The present invention relates to a communication module having a communication circuit comprising a communication interface for transmitting data on an electrical data line.

BACKGROUND

In the past century, narrow band communication sufficed for many industrial applications. Copper cables were laid over great distances since they optimally met the desired requirements. Today, though, continually more control systems, industrial PCs and comparable components communicate with each other or with a control center via Ethernet. The volume of data to be transmitted has thus multiplied. The need for broadband communication is continuously growing. New communication lines are thus no longer being constructed with copper but instead frequently with fiber optic cables. Replacing old, previously laid copper lines with modern fiber optic cable is often expensive and time-consuming. Hence, modern high-speed communication is in many cases realized using the old existing copper lines.

Even if high rates of data can nowadays be transferred at fast speed over old copper lines, such as with modern modulation processes like DSL, for example, there is the problem of the copper wires also transmitting electromagnetic interference, including for example surges caused by distant lightning strikes, which in turn can damage the communication module. The use of appropriate overvoltage protection is thus a basic element of many industrial wired telecommunication applications. A separate overvoltage protection can be used for communication modules. This overvoltage protection does not encompass any communication interface to the communication module.

Printed publication DE 200 01 752 U1 discloses an overvoltage protection magazine and a junction mechanism for telecommunications technology. The overvoltage protection magazine can be rack-mounted to a supporting element and is connected to a junction block and, if applicable, to a cable connector to form a connection system.

SUMMARY

The task underlying the invention is that of specifying a communication module comprising overvoltage protection which reduces wiring complexity and prevents incorrect overvoltage protection wiring.

The subject matter solves this task by means of the features as per the independent claims. The subject matter of the figures, the description and the dependent claims constitute advantageous embodiments of the invention.

According to one aspect of the invention, the task is solved by a communication module having a communication circuit comprising a communication interface for transmitting data on an electrical data line and an overvoltage protection module which is integrated into the communication module in a pluggable manner for protecting the communication circuit from overvoltage on the electrical data line. Thereby achieved for example is the technical advantage of the overvoltage protection module being able to be replaced when defective and of reducing wiring complexity.

In one advantageous embodiment of the communication module, the pluggable overvoltage protection module comprises a gas discharge tube, a protective diode and/or a thyristor. Thereby achieved for example is the technical advantage of efficiently discharging an overvoltage.

In a further advantageous embodiment of the communication module, the pluggable overvoltage protection module has a single connection side for electrically connecting the overvoltage protection module to the communication circuit. Thereby achieved is for example the technical advantage of the overvoltage protection module being able to be easily inserted into the communication module.

In a further advantageous embodiment of the communication module, the pluggable overvoltage protection module is configured to electrically connect to the communication module when the pluggable overvoltage protection module is inserted into the communication module. Thereby achieved is for example the technical advantage of being able to prevent faulty connection of the overvoltage protection module.

In a further advantageous embodiment of the communication module, the overvoltage protection module is integrated into a protection module housing and the communication circuit integrated into a circuit housing. Thereby achieved for example is the technical advantage of being able to prevent damage to the module.

In a further advantageous embodiment of the communication module, the technical design of the protection module housing and the circuit housing are adapted to one another so as to prevent incorrect insertion of the overvoltage protection module. Thereby achieved is for example the technical advantage of preventing incorrect insertion of the overvoltage protection module.

In a further advantageous embodiment of the communication module, the communication module can be mounted on a DIN rail. Thereby achieved is for example the technical advantage of being able to mount the communication module quickly. Given a suitable design, overvoltage can be discharged by way of the DIN rail via the mechanical mounting of the communication module. This further reduces wiring complexity and dispenses with a protective ground wire.

In a further advantageous embodiment of the communication module, the communication circuit comprises a plurality of communication interfaces for transmitting data on a respective electrical data line and the pluggable overvoltage protection module is designed to protect against an overvoltage on each of said electrical data lines. Thereby achieved is for example the technical advantage of the communication module being able to be integrated into a linear structure or a ring structure. Multiple communication interfaces can also form tree structures or serve to increase data throughput. For example, the communication module having a plurality of interfaces can be a node within a star structure, as in a 19-inch rack of a central control.

In a further advantageous embodiment of the communication module, the overvoltage protection module is designed to detect an overvoltage on the electrical data line. Thereby achieved is for example the technical advantage of being able to generate a digital disruption notification in response to the detected interference.

In a further advantageous embodiment of the communication module, the communication module comprises a data interface for transferring data between the overvoltage protection module and the communication circuit. Thereby achieved is for example the technical advantage of being able to utilize the communication module's processing capacity to relay or process the disruption notification.

In a further advantageous embodiment of the communication module, the overvoltage protection module is designed to transmit a status of the overvoltage protection module to the communication circuit. Thereby achieved for example is likewise the technical advantage of being able to utilize the communication module's processing capacity to relay or process the disruption notification.

In a further advantageous embodiment of the communication module, the communication circuit comprises a telecommunication interface for transmitting the status of the overvoltage protection module to an external data network. Thereby achieved is for example the technical advantage of being able to monitor a status of the overvoltage protection module from a remote location.

In a further advantageous embodiment of the communication module, the external data network is a local area network or a mobile communications network. Thereby achieved is for example the technical advantage of being able to be transmit the data to mobile devices.

In a further advantageous embodiment of the communication module, the communication module comprises a web server for externally polling the status of the overvoltage protection module. Thereby achieved is for example the technical advantage of being able to query the status with minimal effort.

In a further advantageous embodiment of the communication module, the communication module is a modem, a switch or a router. Thereby achieved is for example the technical advantage of the communication module being formed by a device suited to data processing. The overvoltage protection module can protect for example Ethernet data lines or be used for a device's supply voltage.

Embodiments of the invention are illustrated in the drawings and will be described in greater detail below.

Shown are:

DETAILED DESCRIPTION

Figure 1:
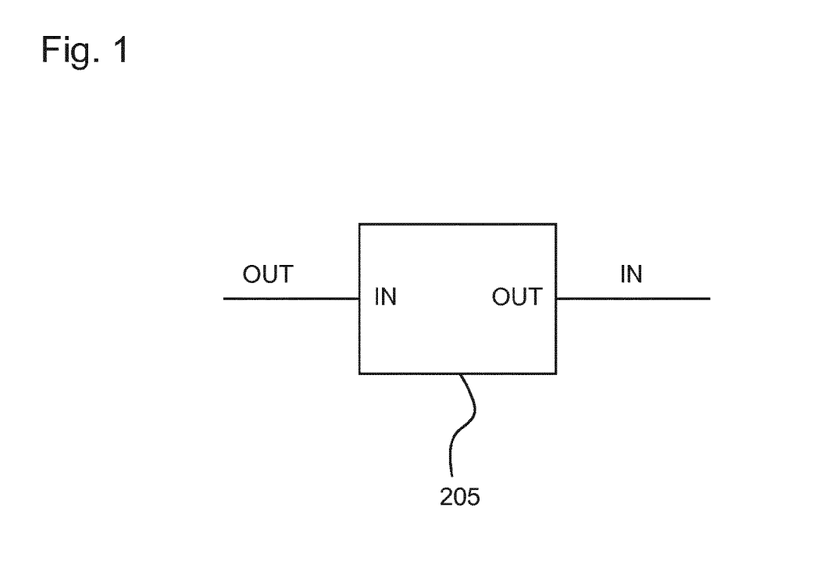
FIG. 1 is a schematic view of an overvoltage protection module.

FIG. 1 shows a schematic view of an overvoltage protection 205. The overvoltage protection 205 has two connections which form an IN input and an OUT output of the overvoltage protection 205. During installation, the IN input and the OUT output can be reversed. If the overvoltage protection 205 is incorrectly connected, such as for example if the connections are reversed, the functioning of the overvoltage protection can no longer be ensured.

Figure 2:
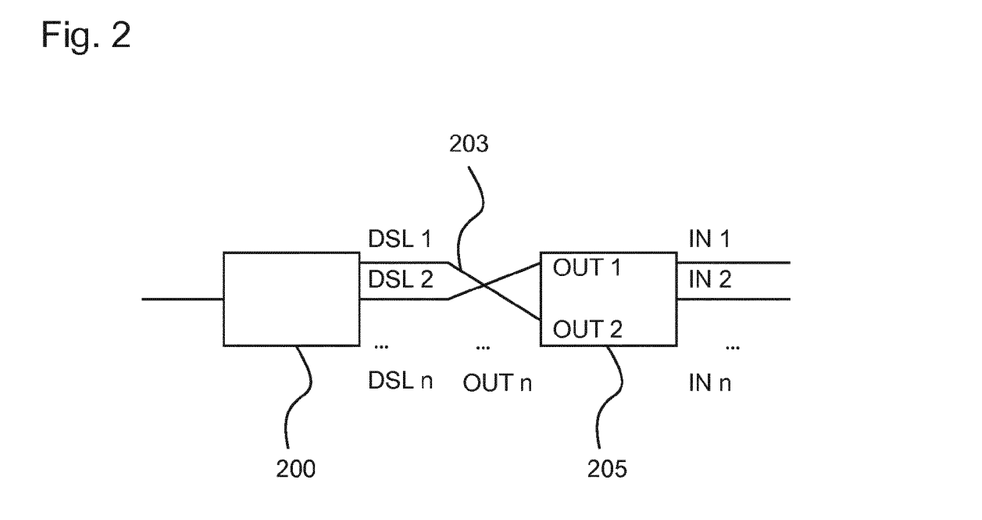
FIG. 2 is a schematic view of a communication module having an external overvoltage protection.

FIG. 2 shows a schematic view of a communication module 200 having an external overvoltage protection 205. The overvoltage protection 205 is an additional component in an electrical cabinet and takes up additional space. The overvoltage protection 205 is wired to the communication module 200 by electrical lines. This thereby increases wiring complexity.

If the communication module 200, such as e.g. an SHDSL Ethernet extender, comprises more than one DSL port and the overvoltage protection 205 has more than one input and one output, the lines between the communication module 200 and the overvoltage protection 205 can be incorrectly wired. Although the IN1 and IN2 inputs and the OUT1 and OUT2 outputs are correctly wired, the DSL1 and DSL2 DSL ports are cross-wired. A wiring error thus results between the communication module 200 and the overvoltage protection 205.

A special overvoltage protection 205 providing high transmission bandwidth and allowing for the passage of high frequency is used for broadband communication. If standard overvoltage protection is used in this case, no high-speed communication can be realized. Properly selecting the overvoltage protection 205 is thus a condition for successful broadband communication. In communication between two subscribers (transmitter/receiver), faulty wiring of the overvoltage protection 205 can occur on both sides. The probability of an error occurring in more than one station thus also rises.

If communication between two communication modules 200 is interrupted, it cannot be verified whether the electrical data line 203 is disrupted, e.g. due to excavation activities, or whether the separate overvoltage protection 205 was tripped and thereby destroyed, e.g. due to a lightning strike. The communication module 200 and the overvoltage protection 205 do not exchange any information with each other.

Figure 3:
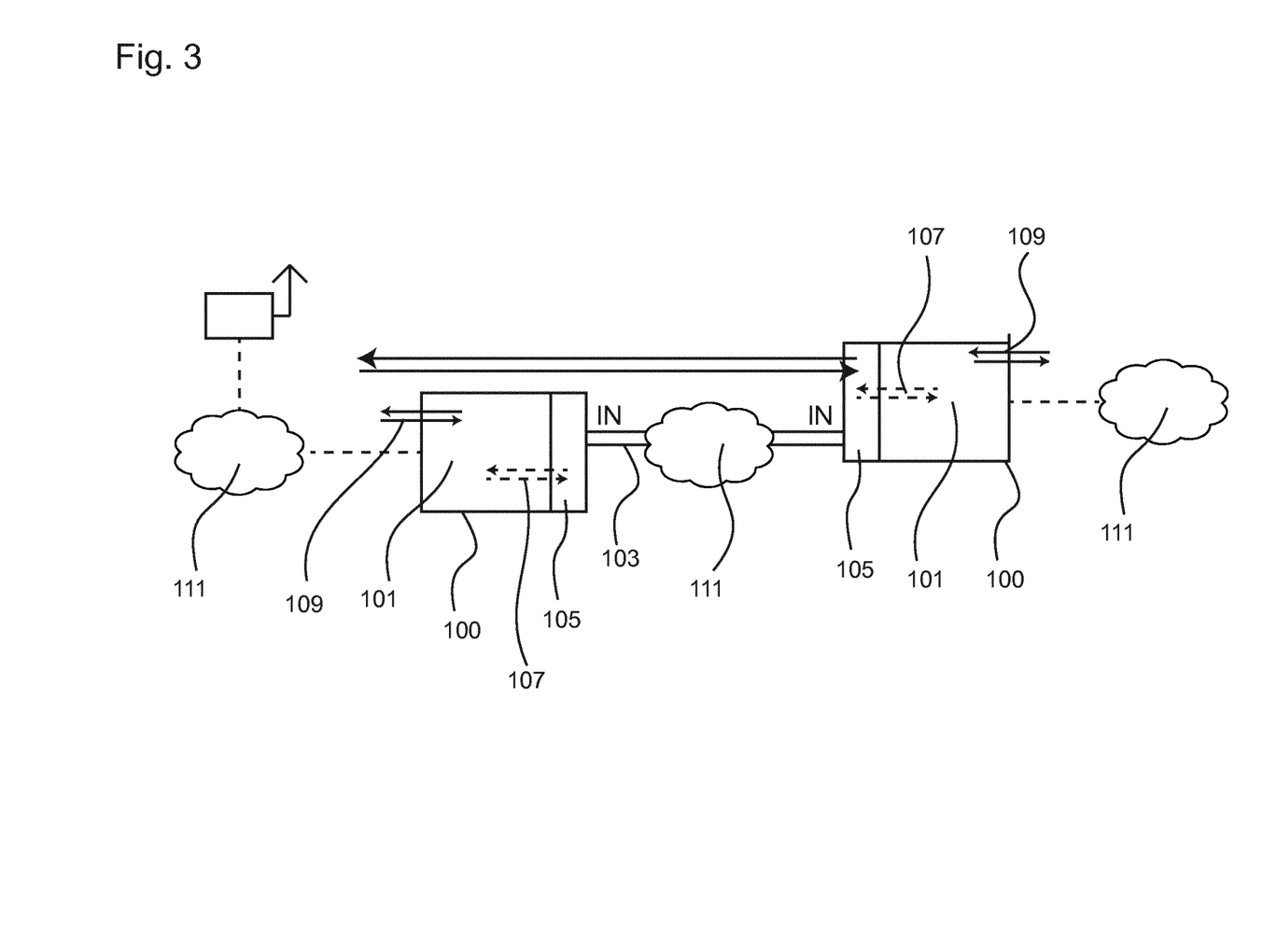
FIG. 3 is a schematic view of a communication module having an integrated overvoltage protection module in point-to-point communication.

FIG. 3 shows a schematic view of a communication module 100 having an integrated overvoltage protection module 105 in point-to-point communication. The communication module 100 comprises a communication circuit 101 having a communication interface for transmitting data on an electrical data line 103. The communication circuit 101 forms for example a modem/router module. The data line 103 consists for example of a pair of electrical conductor wires for telecommunication. The communication module 100 is connected to another communication module through network 111 and a telecommunication interface 109. The other communication module can for example be a mobile communication modem which transmits a local overvoltage protection module 105 alarm into other networks or via which the communication module 100 can be accessed.

The overvoltage protection module 105 is integrated into the communication module 100 as a pluggable module. The overvoltage protection module 105 comprises for example a gas discharge tube or a protective diode, both components in combination, or further protective elements. The overvoltage protection module 105 makes use of both gas discharge tubes as primary protection as well as protective diodes/thyristors as secondary protection.

This results in the advantage of the outputs being disposed in the communication module 100 and the inputs being disposed in the overvoltage protection module 105. Doing so can thus prevent wiring errors. A suitable, productspecific overvoltage protection module 105 can be inserted into the communication module 100.

Integrating the overvoltage protection module 105 enables a more compact design. The overvoltage protection module 105 enables the realizing of a pluggable overvoltage protection having just one connection side for the user. Additionally, integrating a pluggable overvoltage protection module 105 enables simple communication to be realized between the overvoltage protection module 105 and the communication module 100 by means of a data interface 107.

The communication module 100 can be set into a point-to-point communication. A data interface 107 is formed between the communication module 100 and the overvoltage protection module 105 for the communication. The overvoltage protection module 105 detects interference disturbance in the electrical data line 103. A simple case would be detecting the "gas discharge tube ignited" status. The overvoltage protection module 105 thereupon forwards the detected status to the communication circuit 101 such as, for example, a network/modem/router module. The communication circuit 101 can then respond and further process or forward the status.

For example, the communication module 100 can automatically send an alarm over the local network 111 indicating that the overvoltage protection module 100 has already been damaged. A user can thus be promptly informed of a device failure. The user can timely integrate a new overvoltage protection module 105 into the communication line, reduce likelihood of outage and increase availability.

Combining the communication module 100 with the overvoltage protection module 105 enables additional diagnostic functions since as a rule, the communication circuit 101 of the communication module 100 having for example a Linux operating system has more processing power than the pluggable overvoltage protection module having a microcontroller. Diagnostic data can be output for example as simple plain text, e.g. the "overvoltage protection damaged" character string.

The diagnostic data can be depicted as a graphical representation in the web-based management, for example as a time bar, bar chart, statistic or probability. In addition, the communication module 100 can also share the diagnostic data of its own overvoltage protection module 105 with another subscriber, e.g. via a LAN (local area network) or globally via a WAN (wide area network). Readily realizing a centralized or decentralized information database is thereby conceivable.

Figure 4:
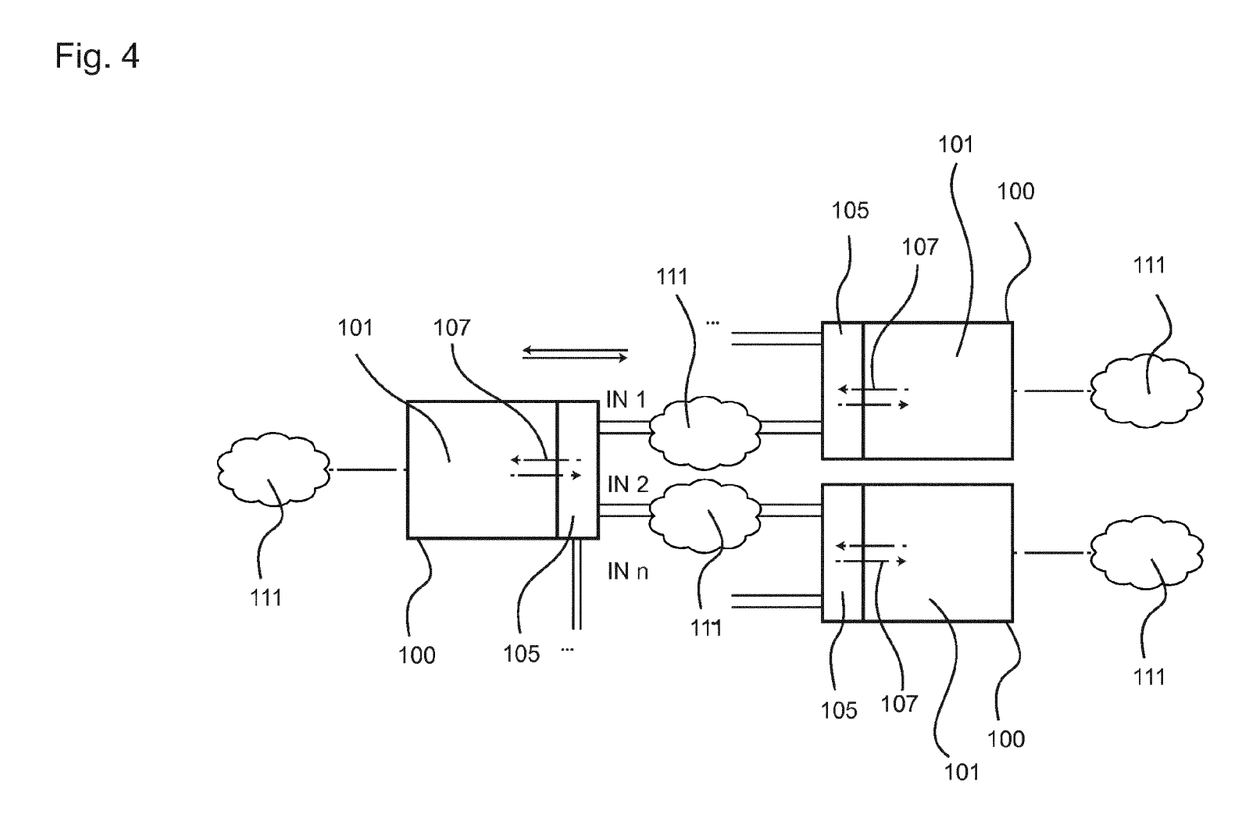
FIG. 4 is a schematic view of a communication module having a plurality of communication interfaces.

FIG. 4 shows a schematic view of a communication module 100 having a plurality of communication interfaces in linear/ring/mixed-structure communication. A user can actively poll the status of the overvoltage protection module 105 remotely through the local network 111, via for example SNMP or by accessing a website.

The communication module 100 further comprises more than one telecommunication interface 109. The communication module 100 can thereby be connected into for example a linear, ring or mixed structure. The status of each overvoltage protection module 105 can thus also be transmitted to other remote devices, which in turn forward the status or an alarm to e.g. other remote devices or within the respective local network.

Figure 5:
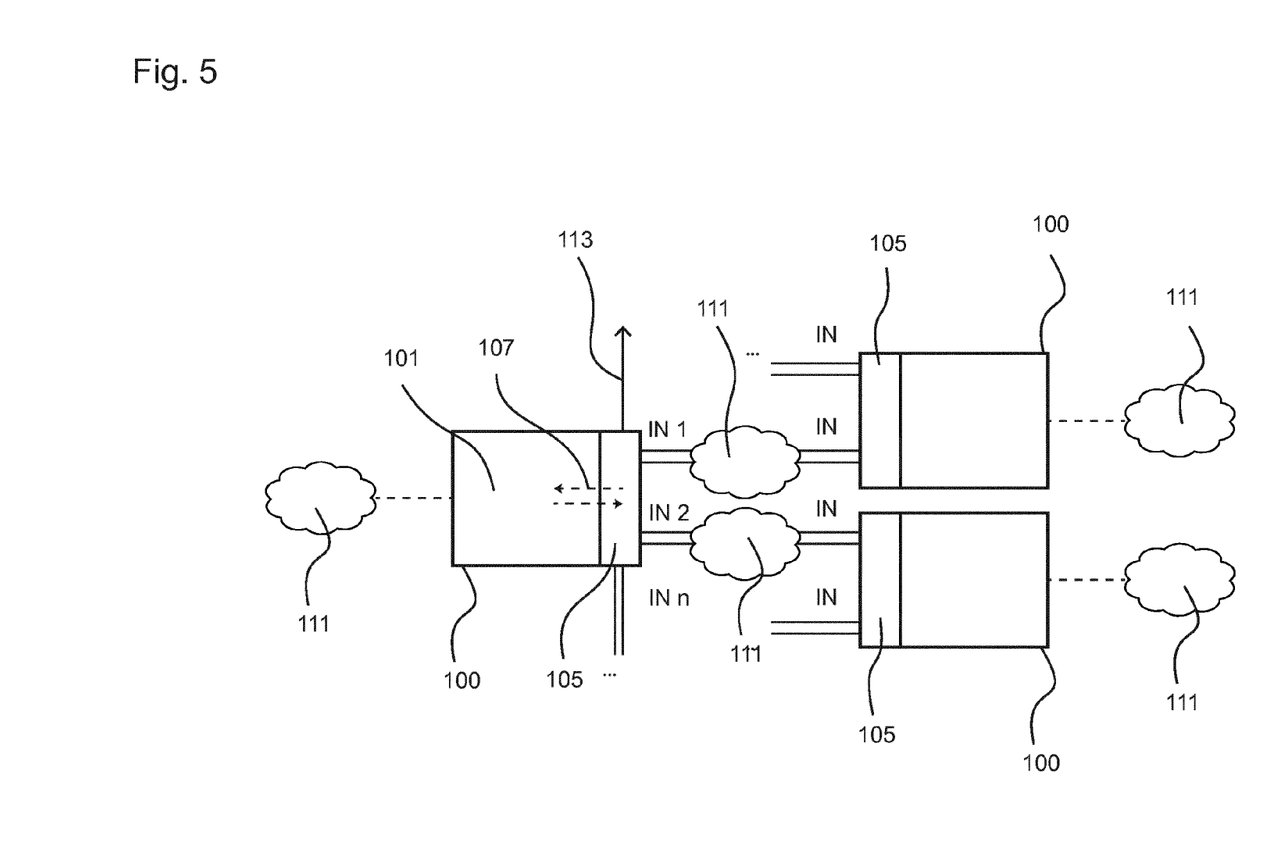
FIG. 5 is a schematic view of a communication module having a plurality of communication interfaces and a status request.

FIG. 5 shows a schematic view of a communication module 100 having a plurality of communication interfaces and a status request in a mixed structure, in which telecommunication is realized by means of various media. Status transmission/status polling of overvoltage protection module 105 occurs via various media such as, for example, wired and/or wireless mobile communication 113.

Generally speaking, the communication module 100 can be of any structural design. For example, the communication module 100 can be mounted together with a housing onto a DIN rail or realized in the form of a 19-inch rack unit such as for a central control.

Figure 6:
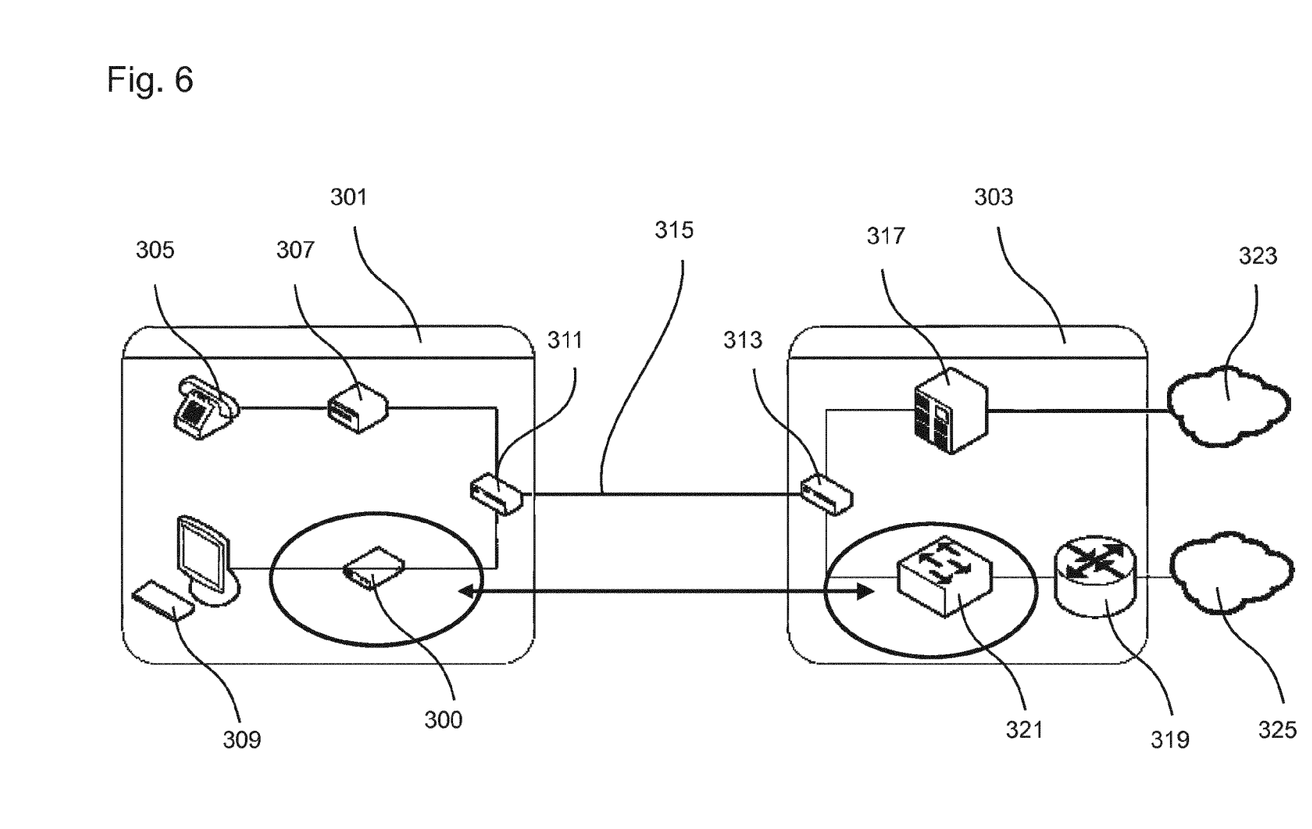
FIG. 6 is an example of a DSL router as a communication module.

FIG. 6 shows a typical application of a DSL router as a communication module 100 in a public telephone network. The DSL router 300 of a subscriber 301 communicates with a digital subscriber line access multiplexer (DSLAM) 321 in a telephone exchange 303. The subscriber 301 is connected to the telephone exchange 303 via splitters 311 and 313 and the subscriber line 315 as the data line.

The subscriber 301 encompasses a telephone 305, a network terminator unit (NTBA) 307, a personal computer 309 and the DSL router 300 as the communication module 100. The DSL router 300 comprises the overvoltage protection module.

The telephone exchange 303 comprises a digital exchange 317, a broadband access server (DSL-AC) 319 and the digital subscriber line access multiplexer (DSL-AM) 321.

The telephone exchange 303 is connected to the telephone network 323 and to the internet 325.

All of the features described and shown in connection with individual embodiments of the invention can be utilized in different combinations in the inventive subject matter so as to realize their advantageous effects simultaneously.

The protective scope of the present invention is conferred by the claims and is not limited by the features exemplified in the description or illustrated in the figures.

LIST OF REFERENCE NUMERALS

100 communication module
101 communication circuit
103 data line
105 overvoltage protection module
107 data interface
109 telecommunication interface
111 data network
113 mobile communication
200 communication module
203 data line
205 overvoltage protection module
300 DSL router
301 subscriber
303 telephone exchange
305 telephone
307 network terminator unit
309 personal computer
311 splitter
313 splitter
315 subscriber line
317 digital exchange
319 broadband access server
321 digital subscriber line access multiplexer
323 telephone network
325 internet

What is claimed is:

1. A communication module, comprising:
   a communication circuit having a communication interface for transmitting data on an electrical data line;
   an overvoltage protection module which is integrated into the communication module in a pluggable manner for protecting the communication circuit from overvoltage on the electrical data line;

a data interface for transferring data between the overvoltage protection module and the communication circuit; and wherein the overvoltage protection module is configured to transmit a status of the overvoltage protection module to the communication circuit during operation, wherein the communication circuit comprises a telecommunication interface for transmitting the status of the overvoltage protection module to an external data network, and wherein the communication module is configured to automatically send an alarm over the external data network indicating that the overvoltage protection in module is damaged.

2. The communication module according to claim 1, wherein the pluggable overvoltage protection module comprises at least one of: a gas discharge tube, a protective diode, or a thyristor.

3. The communication module according to claim 1, wherein the pluggable overvoltage protection module has a single connection side for electrically connecting the overvoltage protection module to the communication circuit.

4. The communication module according to claim 1, wherein the pluggable overvoltage protection module is configured to electrically connect to the communication module when the pluggable overvoltage protection module is inserted into the communication module.

5. The communication module according to claim wherein the overvoltage protection module is integrated into a protection module housing and the communication circuit is integrated into a circuit housing.

6. The communication module according to claim 5, wherein the protection module housing and the circuit housing are configured to prevent an incorrect insertion of the overvoltage protection module into the communication module.

7. The communication module according to claim 1, wherein the communication module is mountable on a Deutsches Institut für Normung (DIN) rail.

8. The communication module according to claim 1, wherein the communication circuit comprises a plurality of communication interfaces for transmitting data on a respective electrical data line and the pluggable overvoltage protection module is configured to protect against an overvoltage on each of said electrical data lines.

9. The communication module according to claim 1, wherein the overvoltage protection module is configured to detect an overvoltage on the electrical data line.

10. The communication module according to claim 1, wherein the external data network is a local area network or a mobile communications network.

11. The communication module according to claim 1, wherein the communication module comprises a web server for externally polling the status of the overvoltage protection module.

12. The communication module according to claim 1, wherein the communication module is at least one of: a modem, a switch, or a router.

* * * * *